(12) United States Patent
Oien et al.

(10) Patent No.: US 12,032,363 B2
(45) Date of Patent: Jul. 9, 2024

(54) METHOD AND APPARATUS FOR RECONFIGURING A MATERIAL PROCESSING PLANT

(71) Applicant: Terex USA, LLC, Westport, CT (US)

(72) Inventors: Rachael Oien, Cedar Rapids, IA (US); Michael Peter Stemper, Marion, IA (US); Edwin J. Sauser, Monticello, IA (US)

(73) Assignee: Terex USA, LLC, Westport, CT (US)

( * ) Notice: Subject to any disclaimer, the term of this patent is extended or adjusted under 35 U.S.C. 154(b) by 0 days.

(21) Appl. No.: 17/528,269

(22) Filed: Nov. 17, 2021

(65) Prior Publication Data
US 2022/0155766 A1 May 19, 2022

Related U.S. Application Data

(60) Provisional application No. 63/114,632, filed on Nov. 17, 2020.

(51) Int. Cl.
*G05B 19/418* (2006.01)

(52) U.S. Cl.
CPC ... *G05B 19/41865* (2013.01); *G05B 19/4183* (2013.01); *G05B 19/4184* (2013.01); *G05B 19/41845* (2013.01)

(58) Field of Classification Search
CPC .......... G05B 19/41865; G05B 19/4183; G05B 19/4184; G05B 19/41845; B02C 23/02; B02C 21/02; B65G 11/126; B65G 47/72; Y02P 90/02
See application file for complete search history.

(56) References Cited

U.S. PATENT DOCUMENTS

| 2008/0146300 A1* | 6/2008 | Wallace ................ A01D 33/10 460/114 |
| 2010/0326065 A1* | 12/2010 | Permi .................... B07B 1/005 241/34 |
| 2013/0126648 A1* | 5/2013 | Robinson ............... B02C 23/04 241/81 |
| 2014/0158798 A1* | 6/2014 | Cohen .................... B02C 23/08 241/24.1 |
| 2014/0224906 A1* | 8/2014 | Dunn ................... B02C 21/026 209/241 |

(Continued)

*Primary Examiner* — Kenneth M Lo
*Assistant Examiner* — Mohammed Shafayet
(74) *Attorney, Agent, or Firm* — Simmons Perrine Moyer Bergman PLC

(57) ABSTRACT

A dual positioned recirculating chute that would allow the operator to run the plant in either closed circuit or open circuit position. While in closed circuit position, the plant will run rock through and the chute will provide as a recirculating chute for oversized rock to travel from the recirculating conveyor back into the feeder hopper for re-crushing. The operator can then reposition the chute to the open circuit position, which will change the direction of the chute away from the feeder hopper and discharge material off the side of the plant. This can be oversized rock material to form an additional stock pile or be redirected to an off-plant conveyor. This can also allow for the removal of trash and unwanted material from the plant cycle without the need for a full plant shutdown, locking out the proper equipment, and manually removing before restarting the crushing process again.

17 Claims, 5 Drawing Sheets

(56) References Cited

U.S. PATENT DOCUMENTS

| | | | | |
|---|---|---|---|---|
| 2016/0279644 A1* | 9/2016 | Stemper | ............... | B07B 1/005 |
| 2018/0304271 A1* | 10/2018 | Bojinescu | ............... | B02C 4/286 |
| 2019/0083988 A1* | 3/2019 | Furrer | ............... | B02C 21/026 |
| 2021/0039107 A1* | 2/2021 | Meyer | ............... | B02C 1/025 |
| 2022/0072736 A1* | 3/2022 | Steffens | ............... | B60R 3/00 |

* cited by examiner

METHOD AND APPARATUS FOR RECONFIGURING A MATERIAL PROCESSING PLANT

CROSS REFERENCE TO RELATED APPLICATIONS

The present application claims the benefit of the filing date of provisional patent application having Ser. No. 63/114,632 filed on Nov. 17, 2020 by the same inventors entitled Reject Chute, which application is incorporated herein in its entirety by this reference.

FIELD OF THE INVENTION

The present invention generally relates to systems and methods for mobile rock crushing and/or screening plants.

BACKGROUND OF THE INVENTION

This invention relates to mobile rock crushing and/or screening plants. A portable rock crushing and/or screening processing plant is either a single crusher or screen or a collection of several units, each performing various material processing functions to prepare aggregate materials for use for, but not limited to, concrete and asphalt products. The various units can perform various stages of crushing, screening, conveying, and washing of aggregate and recycle materials. Portability is achieved by positioning the plants on towable or haulable modules, so that the plant can service multiple locations where processed materials can be produced.

Crushing systems primarily in recycle applications process a variety of materials in addition to the desired rock product. This can include rebar, blasting wire, fabric layers, etc. When the broken-up pieces of concrete are placed in the crushing machine, measures have already been taken to eliminate the presence of rebar and other metals through use of metal detectors and magnets. Some unwanted material is small enough to pass through the screen decks onto a conveyor that is discharging off the plant. However, some larger unwanted material may not pass through the screen decks and therefore will travel from the screen deck overs into the recirculating conveyor on the plant to be directed back to the feeder hopper for re-crushing.

This larger unwanted material will begin to accumulate as it passes through the crusher, follows the paths of the conveyors, and remains too large of an object to fall through the screening process. This material can begin to interfere with rocks screening properly and can also tangle and get stuck in the machinery, causing possible damage. With no way to safely remove this unwanted material from the recirculating cycle, a need for a full plant shut down and lockout/tagout will often occur and the operator would often have to manually remove this material from the crushing plant. Once the material is manually removed, only then can the operator safely restart the plant and begin to crush rock again. This downtime can be lengthy and can result in a loss of daily tonnage processed by the crushing plant. This could also result in a safety hazard as an operator may inappropriately choose to not properly shutdown and lockout the equipment before beginning to manually remove the unwanted material.

Consequently, there is a need for improvement in portable material processing equipment which eliminates or greatly reduces the down time associated with removal of unwanted material from the plant cycle.

SUMMARY OF THE INVENTION

More specifically, an object of the invention is to provide efficient mobile material processing plants.

It is a feature of the present invention to include a hinged chute.

It is another feature of the present invention to include a pair of actuators.

It is an advantage of the present invention to decrease the downtime required to clear unwanted material from a recirculating conveyor It is yet another feature to have a processing plant which is reconfigurable from a closed to an open configuration by merely adjusting a length characteristic of at least one actuator.

The present invention includes the above-described features and achieves the aforementioned objects and advantages.

Accordingly, the present invention comprises the steps of:
providing a crusher;
providing a vibrating screen;
providing a conveyor from the vibrating screen back toward an input of the crusher;
providing a dual positionable chute disposed between an output of said conveyor and an input to said crusher;
providing a plurality of actuators; and
manipulating hydraulic pressure to one of said plurality of actuators coupled to a portion of said dual positionable chute and to a member; so that said dual positionable chute is caused to hinge from a closed circuit configuration to an open circuit configuration raising and lowering a portion of said dual positionable chute.

Additionally, the present invention comprises:
A mobile material processing plant comprising:
a chassis,
a crusher disposed on the chassis;
a screen disposed on the chassis;
a conveyor receiving material from said screen and elevating it to a position above an input to said crusher;
a dual positionable chute disposed between said conveyor and said input to said crusher; and
said dual positionable chute being configured to pivot about an axis so that material falling from said position is directed in different directions depending upon a hydraulic pressure in an actuator which has a linear dimension which changes depending upon hydraulic pressure.

Also, the present invention comprises:
A method of redirecting material off a crushing plant with a chute in an open circuit position comprising the steps of:
providing dual actuators coupled to the chute, and when said dual actuators are fully extended or until a first end of the chute section rests against a hinge mechanism directing the chute section away from a feeder hopper;
allowing for material to be rejected from the plant cycle and safely removed; and
allowing for oversized rock material to exit a recirculating conveyor, and travel down the chute onto an off-plant location.

BRIEF DESCRIPTION OF THE DRAWINGS

In the following description of the drawings, like reference numerals are employed to indicate like parts, in the various views.

DETAILED DESCRIPTION OF THE DRAWINGS

Figure 1:
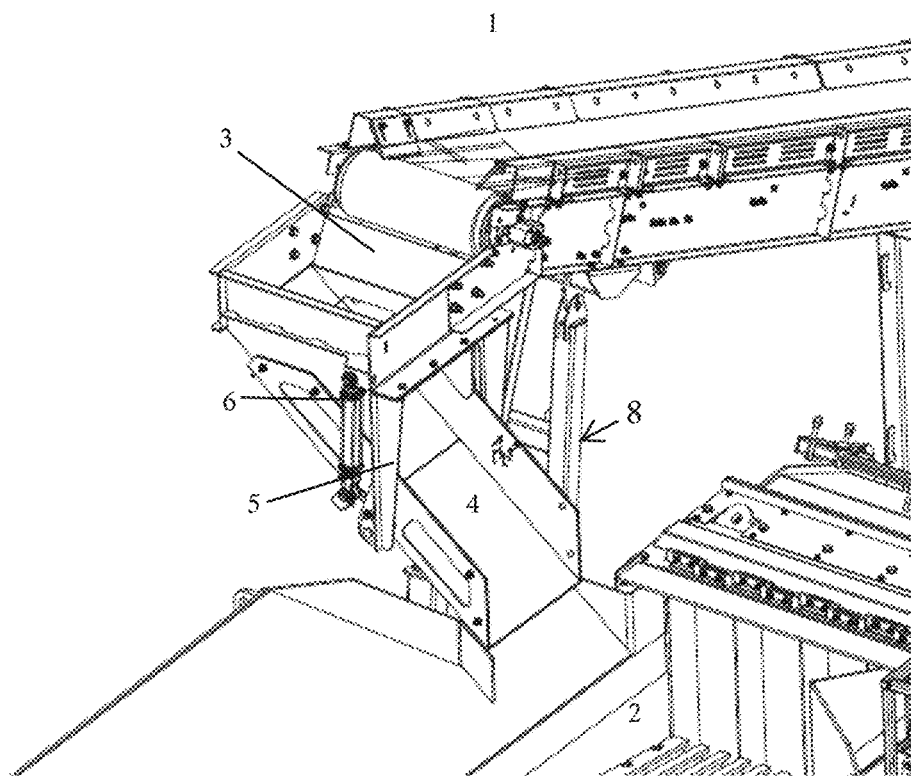
FIG. 1 is a partial perspective view of a system of the present invention with the chute in a closed circuit configuration.

Now referring to the drawings where like numerals refer to like matter throughout, and more specifically to FIG. 1, there is shown a dual positionable chute 4 in the closed-circuit chute position. Material is sorted by a screen with portions of the material directed onto the recirculating conveyor 1. Recirculating conveyor 1 then discharges into the head section 3 and then to the dual positionable chute 4 and into the feeder hopper 2 for re-crushing. The head section 3 is attached directly to the recirculating conveyor 1 and moves in accordance with the conveyor 1. This head section 3 does not have any additional wear items as material will primarily contact the chute 4. The chute 4 is in an embodiment preferably fully lined with replaceable abrasion resistant liners and is connected to the head section 3 by a hinged mechanism 5. While in closed circuit position, the dual actuators 6 are to be fully retracted or until the chute 4 rests against the bottom of the head section 3.

Figure 2:
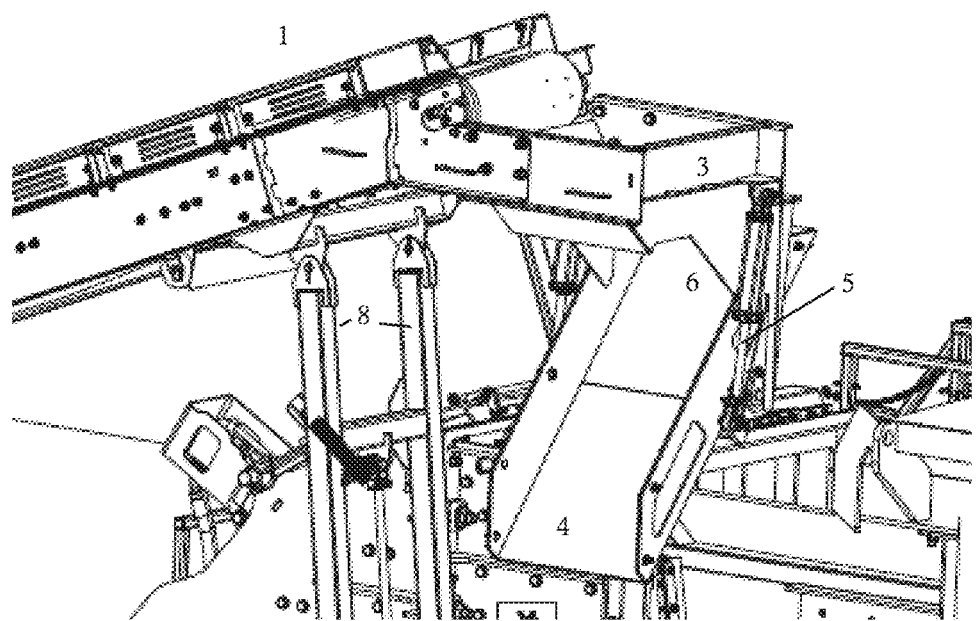
FIG. 2 is a perspective view of the system of FIG. 1, except that the chute is in an open circuit configuration.

Now referring to FIG. 2, there is shown the dual positionable recirculating chute 4 in the open circuit position. The open circuit position of the chute 4 can be utilized in two ways. First, material is sorted by the screen and then directed onto the recirculating conveyor 1. The recirculating conveyor 1 then discharges into the head section 3 and drops onto the chute 4 to be discharged off plant. Second, in a trashing situation, the plant will continue to run without new rock being added into the hopper. Once the rock has been all distributed and cycled through the plant and no rock is being directed up the recirculating conveyor 1, the open circuit position can be used to discharge unwanted materials off the side of the plant. The chute 4 is held in position by the hinge 5 and the dual actuators 6 are actuated to fully extend, or until chute 4 comes to rest against the hinge 5. Supporting the discharge end of the recirculating conveyor are conveyor supports 8.

The unwanted fabric material responds poorly to the change of directions due to its weight and size. Because of this, the head section 3 length has been designed to stay out of the material path. Due to the angled troughing rolls in the recirculating conveyor 1, the material conveyed on the belt will collect and ride down the center of the belt forming a bell curved shape distribution across the width of the belt. The flashing on the belt 7 acts as a boundary on either side of the recirculating conveyor 1 to keep the material within its bounds.

Figure 3:
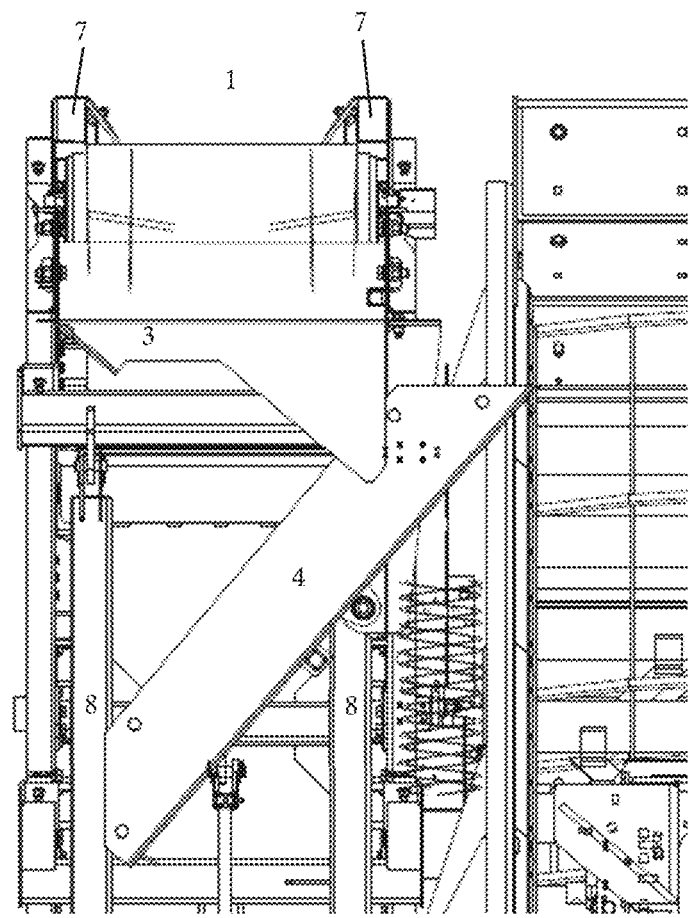
FIG. 3 is a cross-section view of a portion of FIG. 2.
Figure 4:
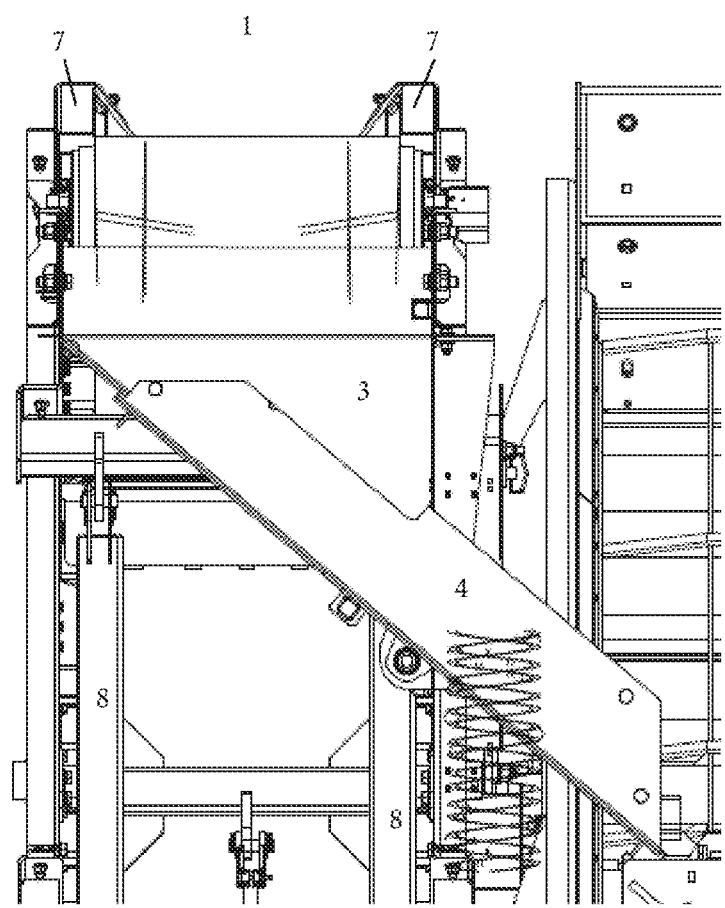
FIG. 4 is a cross-section view of a portion of FIG. 1.
Figure 5:
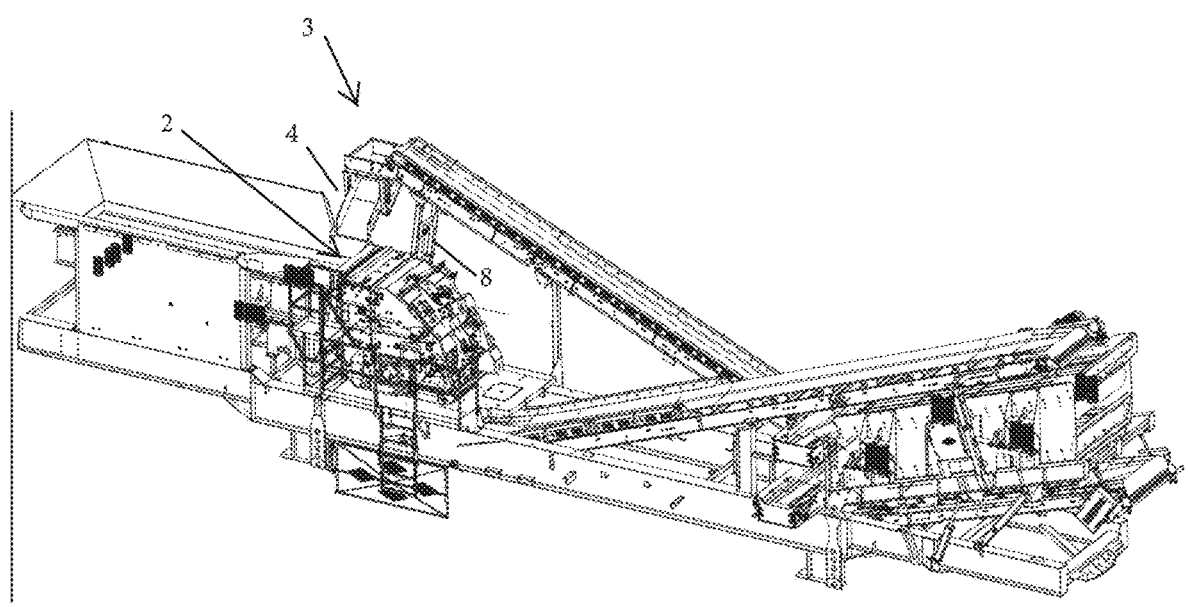
FIG. 5 is a full plant perspective view of the present invention which in a configuration as shown in FIGS. 1 and 4.

Now referring to FIG. 3, the fixed side of the head section 3 is outside of the bounds of the recirculating conveyor 3 flashing 7. Therefore, any material (rock or unwanted) will drop through the head section 3 and make contact with the chute 4 eliminating the change of direction that would be necessary had this head section 3 been made to pass into the material path.

As the equipment needs to travel over the road from work site to work site, the machine must conform to travel envelope restrictions. Extremities of the equipment are folded within these envelope restrictions prior to transport. The geometry of the chute hinge 5 allows for the chute to fold down along the side of the machine during transport. This same hinge 5 geometry is such that during operation, the chute can direct material into the feeder hopper 2.

Now referring to FIGS. 1-5, the system material processing plant of the present invention can be reconfigured rapidly from a closed circuit to an open circuit configuration with the simple manipulation of a single hydraulic control valve which could move the actuators 6 to expand and contract and thereby cause the chute 4 to hinge from a right discharge to a left discharge direction and vice versa.

The figures show a pair of actuators which may be preferred but any number of a plurality of actuators will provide at least some of the benefits as described herein. The actuators may be pneumatic, electro-mechanical, crisscross, or other suitable substitutes.

It is believed that when these teachings are combined with the known prior art by a person skilled in the art of mobile rock crushing and screening operations and equipment manufacture, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

We claim:

1. A method of configuring a material processing plant comprising steps of:
    providing a crusher, having an input;
    providing a vibrating screen;
    providing a conveyor, configured to move material to be processed, from the vibrating screen back toward said input of the crusher;
    providing a dual positionable chute disposed between an output of said conveyor and the input to said crusher, said dual positionable chute having an inside surface and an outside surface, where said inside surface is configured for contacting, directing and guiding said material to be processed to move along said inside surface toward said crusher, and not permitting any of said material to pass through the dual positionable chute from said inside surface through to said outside surface;
    providing a plurality of actuators;
    manipulating hydraulic pressure to one of said plurality of actuators coupled to a first portion of said dual positionable chute and to a member; so that said dual positionable chute is caused to hinge from a closed circuit configuration to an open circuit configuration raising and lowering a second portion of said dual positionable chute; and
    wherein said material processing plant utilizes only gravity and hinging of said dual positionable chute to move material exiting said conveyor to the input of said crusher.

2. The method of claim 1, wherein said chute is a non-discriminating chute and said step beginning with the words of "providing a conveyor" further includes providing a recirculating conveyor so that output of said vibrating screen is recirculated back to said crusher.

3. The method of claim 1, further comprising the steps of:
providing a hinge about which said conveyor can pivot and thereby changing said material processing plant from a closed configuration to an open configuration.

4. The method of claim 3, wherein each of said plurality of actuators is a hydraulic linear actuator.

5. The method of claim 3, wherein each of said plurality of actuators is configured to receive input hydraulic commands from a control.

6. The method of claim 3, wherein each of said plurality of actuators is coupled to a source of hydraulic fluid where a change in a hydraulic pressure of said hydraulic fluid results in a change in a linear dimension of each of said plurality of actuators.

7. The method of claim 6, wherein said "change in a linear dimension" is in a same direction for each of said plurality of actuators.

8. The method of claim 3, wherein said dual positionable chute alternates from right discharge direction to a left discharge direction by merely manipulating a single hydraulic control lever.

9. The method of claim 3, wherein each of said plurality of actuators is coupled to a single source of hydraulic fluid under pressure.

10. A mobile material processing plant comprising:
a chassis,
a crusher, having an input, disposed on the chassis;
a screen disposed on the chassis;
a conveyor receiving material from said screen and elevating it to a position above the input to said crusher;
a dual positionable chute disposed between said conveyor and said input to said crusher;
said dual positionable chute is not configured with predetermined apertures therein to allow passage of material there through that is smaller than said predetermined apertures,
wherein said material processing plant utilizes only gravity and hinging of said dual positionable chute to move material exiting said conveyor to the input of said crusher; and
said dual positionable chute being configured, to pivot about an axis so that material falling from said position is directed in different directions depending upon a hydraulic pressure in an actuator which has a linear dimension which changes depending upon hydraulic pressure.

11. The mobile material processing plant of claim 10, further comprising a head section disposed between said conveyor and said crusher.

12. The mobile material processing plant of claim 11, further comprising a hinge disposed between said head section and said crusher.

13. The mobile material processing plant of claim 12, wherein said hinge is configured to permit a first end of said chute to pivot in and out of contact with a portion of said head section.

14. The mobile material processing plant of claim 13, wherein the chute has a second end which pivots in a different angular direction than said first end when said dual positionable chute moves from a first position to a second position.

15. The mobile material processing plant of claim 14, wherein said first end is adjacent to said head section when said mobile material processing plant is in a closed circuit configuration.

16. The mobile material processing plant of claim 15 is free of any latches which hold said dual positionable chute in particular orientation until unlatched.

17. A method of redirecting material off a crushing plant with a chute in an open circuit position comprising the steps of:
providing dual actuators coupled to the chute, wherein said chute does not include a vibrating screen with predetermined apertures therein to allow passage of material there through that is smaller than said predetermined apertures, and when said dual actuators are fully extended or until a first end of the chute rests against a hinge mechanism directing the chute away from a feeder hopper;
allowing for material to be rejected from the plant cycle and safely removed;
allowing for oversized rock material to exit a recirculating conveyor, and travel down the chute onto an off-plant location; and
wherein only gravity and hinging of said chute are used to move material exiting said recirculating conveyor to said feeder hopper.

* * * * *